No. 850,695. PATENTED APR. 16, 1907.
J. J. M. A. VERMEESCH.
PROCESS OF MANUFACTURING CUPRAMMONIUM SOLUTIONS.
APPLICATION FILED SEPT. 25, 1906.
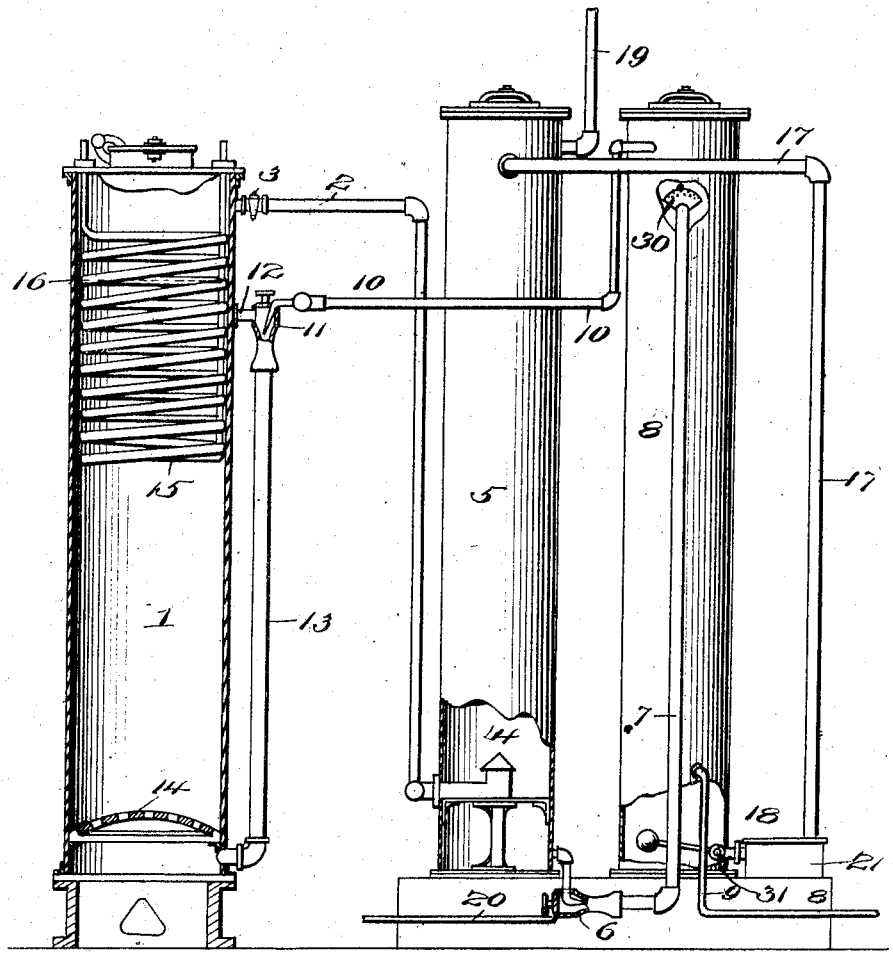

UNITED STATES PATENT OFFICE.

JULIEN JOSEPH MARIE AUGUSTE VERMEESCH, OF SCHAERBEEK-LEZ-BRUSSELS, BELGIUM.

PROCESS OF MANUFACTURING CUPRAMMONIUM SOLUTIONS.

No. 850,695.

Specification of Letters Patent.

Patented April 16, 1907.

Application filed September 25, 1906. Serial No. 336,113.

*To all whom it may concern:*

Be it known that I, JULIEN JOSEPH MARIE AUGUSTE VERMEESCH, a subject of the King of the Belgians, residing at Schaerbeek-lez-Brussels, in Belgium, have invented a certain new and useful Process of Manufacturing Cuprammonium Solutions, of which the following is a specification.

This invention relates to a process of manufacturing ammonia-metal compounds, more particularly copper-ammonia oxid.

The essence of the invention consists of ammonia-water and air being caused to act in constant circle on the metal in such manner that all loss of ammonia is avoided, a very energetic action of the same on the metal being insured, and a solution of ammonium-metal compounds obtained in as concentrated form as possible.

For a full understanding of the invention reference is to be had to the following description and accompanying drawing, which shows in side elevation one form of apparatus designed for carrying out the process, a portion of the apparatus being shown in section in order to more clearly illustrate the construction of the same.

It is already known that simultaneous artificial admission of air during the action of ammonia on the metal assists the reaction. According to this invention, however, not simply air, but a current of compressed air saturated with ammonia-gas, is admitted into the reaction-column. This saturation is effected by means of the ammonia contained in the gases escaping from the column, the ammonia being condensed to that end with water, whereupon the ammonia liquid obtained is mixed in atomized state with compressed air, which is then again introduced into the reaction-column. As already stated, in this way not only the oxidation of the metal is accelerated, but, more particularly when manufacturing concentrated ammonia-copper oxid, the ammonia not yet combined with the metal is again brought to act on the metal in a constant circle without any considerable losses.

Air charged with vapors of ammonia is not admitted direct into the reaction-column, where it would rise upward in the shape of bubbles, but is introduced into a long pipe, in which the mixture of gas carries with it near the bottom of the column the ammonia-water contained in the latter. In this way the ammonia liquid is considerably enriched with air, and in this way the reaction area and the reaction capacity are considerably increased, and therefore the time occupied by the reaction is considerably reduced. The new process has also the advantage compared to well-known processes that it is necessary to have only one reaction column or apparatus. For this process it is by no means necessary to use concentrated-ammonia liquid, but only that of a certain strength. Further, according to this invention air saturated with ammonia is introduced into the column by means of an injector or a similarly-acting device, the said injector at the same time drawing out the liquid contained in the reaction-column—that is to say, producing a thorough mixture of air, ammonia, and liquid. This thorough reciprocal action of air and liquid as produced by the injector is still more assisted by the air meeting the liquid in the reaction-column after having been previously saturated with ammonia, in consequence of which the air is much more readily absorbed by the liquid.

A construction of apparatus used for carrying out the process is illustrated, by way of example, in the accompanying drawing.

The reaction-column 1 is provided at the top with a pipe 2, with a cock 3, the said pipe leading to the bottom of a condenser 5, which is preferably a cylinder filled with coke, the bottom of which is connected, by means of an injector 6 and pipe 7, to the top of a vessel 8, serving for atomizing the ammonia liquid and mixing the ammonia thus liberated with compressed air, the end of the pipe being formed into an atomizer 30 of any desired construction.

The condenser 5 is connected at the top by a pipe 17 to a tank 21, provided with a float-valve 31 of any conventional construction, and the tank 21 is connected, by means of a branch 18, to the bottom of the mixing-column 8. The latter is also provided at the bottom with a compressed-air-supply pipe 9 and at the top with a pipe 10, leading to an injector 11. The said pipe 10 is also connected by a branch 12 to the top portion of the reaction-column and by a pipe 13 to the bottom portion of the same. Close above the junction of the pipe 13 with the reaction-column the latter is provided with a perforated bottom 14, while at the top it has a cooling-coil 15. The whole empty space of the column is filled with copper shavings and also up to the level 16 with ammonia liquid, the level of which is slightly above the injector branch 12.

Compressed air charged with ammonia is admitted to the injector 11 through the pipe 10, the injector drawing out the liquid contained in the reaction-column 1 through the branch 12 and conveying the mixture of air, ammonia, and water through the pipe 13 downward into the space below the grating 14, whence it rises in the column, the reaction taking place in well-known manner.

As already stated, owing to the constant circle of operation of the liquid the oxidation is greatly accelerated. The quantity of mixture of ammonia, air, and water vapors which passes into the topmost part of the column 1 comes out through the pipe 2 and issues under the cap 4 into the condenser 5, the coke of which is kept moistened with water from the top through the pipe 17, the said water on its way downward becoming more and more saturated with ammonia and finally collecting in the bottom of the condenser, whence it is conveyed, by means of the injector 6 or of a pump, through the pipe 7 into the upper portion of the mixing-column 8. The pumping device 6 is preferably a steam-jet apparatus, 20 representing the steam-supply pipe. The liquid drawn from the vessel 5 is heated by the steam in the pipe 7, the escape of ammonia from the liquid thus being facilitated and the fall of temperature due to the said evaporation being made up.

In the mixing-column 8 the liquid is atomized and descends in a fine shower in the direction opposite to the current of fresh compressed air introduced through the pipe 9. The said air is thus saturated with ammonia and supplied through the pipes 10 13 and the injector 11 to the reaction-column 1, so that the ammonia which escapes at 3 is utilized again and again.

The quantity of water serving for condensing the ammonia gas always remains the same, for the pipe 17, which serves for moistening the coke-tower 5, is connected, by means of the branch 18 and the float-valve 31, to the bottom part of the mixing-column 8, so that the water supplied by the pipe 7 to the mixing-column at the top and collecting at the bottom of the same after reaching a certain level opens the float-valve, whereupon the water is forced upward in the pipe 17, owing to the pressure of air in the column 8, and again supplied to the coke-tower 5. The air freed from ammonia in the said coke-tower 5 escapes at the top through the branch 19, so that, except the ammonia chemically combined with copper, there is no loss of ammonia.

What I claim as my invention, and desire to secure by Letters Patent, is—

1. The process of manufacturing cuprammonium solutions, which consists in introducing copper into an ammonium-hydroxid solution, mixing air with ammonia-gas, and then passing the air commingled with ammonia-gas through the said ammonium-hydroxid solution.

2. The process of manufacturing cuprammonium solutions, which consists in introducing copper into an ammonium-hydroxid solution, and in causing the uncombined ammonia to be brought into repeated contact with the copper by circulation.

3. The process of manufacturing cuprammonium solutions, which consists in introducing copper into an ammonium-hydroxid solution, in mixing some of the ammonium-hydroxid solution with air commingled with ammonia, and in introducing the mixture thus obtained into the main body of the ammonium-hydroxid solution where it can act upon the copper.

4. The process of manufacturing cuprammonium solutions, which consists in introducing copper into an ammonium-hydroxid solution, in condensing the uncombined ammonia escaping from the solution, commingling air with the condensed ammonia, mixing the commingled air and ammonia thus obtained with some of the ammonium-hydroxid solution, and in introducing this mixture into the main body of the ammonium-hydroxid solution where it can act upon the copper.

5. The process of manufacturing cuprammonium solutions, which consists in introducing copper into an ammonium-hydroxid solution, in producing a constant circulation of the ammonium-hydroxid solution through an outside channel, and in passing air commingled with ammonia through the outside channel, whereby the commingled air and ammonia is thoroughly mixed with the ammonium-hydroxid solution before being brought into contact with the copper.

6. The process of manufacturing cuprammonium solutions, which consists in introducing copper into an ammonium-hydroxid solution, in producing a constant circulation of the ammonium-hydroxid solution through an outside channel by means of an injector, and operating the injector by means of air commingled with ammonia whereby the commingled air and ammonia is thoroughly mixed with the ammonium-hydroxid solution before being brought into contact with the copper.

7. The process of manufacturing cuprammonium solutions, which consists in introducing copper into an ammonium-hydroxid solution, in atomizing ammonia-water, in passing a current of air through the atomized ammonia-water, and in passing the air commingled with ammonia thus obtained through the ammonium-hydroxid solution where it is brought into contact with the copper.

8. The process of manufacturing cuprammonium solutions, which consists in introducing copper into an ammonium-hydroxid solution, condensing the uncombined ammonia escaping from the ammonium-hydroxid solution by bringing the same into contact with water, withdrawing the ammonia-water thus obtained from the condenser by means of a steam-injector, the heat of the steam facilitating the escape of ammonia from the liquid, atomizing the products of condensation, passing a current of air through the said atomized products of condensation whereby the air becomes commingled with ammonia, and in passing the commingled air and ammonia thus obtained through the ammonium-hydroxid solution where it is brought into contact with the copper.

In testimony whereof I have signed my name to this specification in the presence of two subscribing witnesses.

JULIEN JOSEPH MARIE AUGUSTE VERMEESCH.

Witnesses:
A. GRAETZ,
GREGORY C. KELAN.